(12) United States Patent
Hanke et al.

(10) Patent No.: US 9,067,345 B2
(45) Date of Patent: Jun. 30, 2015

(54) MOLD FOR MANUFACTURE OF FIBER COMPOSITE PARTS AND METHOD OF MANUFACTURE OF FIBER COMPOSITE PARTS WITH SUCH A MOLD

(75) Inventors: Michael Hanke, Braunschweig (DE); Sebastian Malzahn, Stade (DE); Michael Kuehn, Hollern-Twielenfleth (DE)

(73) Assignee: Deutches Zentrum fuer Luft- und Raumfahrt e.V., Cologne (DE)

(*) Notice: Subject to any disclaimer, the term of this patent is extended or adjusted under 35 U.S.C. 154(b) by 830 days.

(21) Appl. No.: 13/165,237

(22) Filed: Jun. 21, 2011

(65) Prior Publication Data

US 2012/0018919 A1  Jan. 26, 2012

(30) Foreign Application Priority Data

Jun. 24, 2010 (DE) .......................... 10 2010 024 985

(51) Int. Cl.
| | |
|---|---|
| B29C 45/00 | (2006.01) |
| B29C 33/40 | (2006.01) |
| B29C 33/00 | (2006.01) |
| B29C 70/44 | (2006.01) |
| B29C 70/46 | (2006.01) |
| B29C 70/54 | (2006.01) |

(52) U.S. Cl.
CPC ............. *B29C 33/40* (2013.01); *B29C 33/0038* (2013.01); *B29C 33/0055* (2013.01); *B29C 33/0061* (2013.01); *B29C 70/443* (2013.01); *B29C 70/46* (2013.01); *B29C 70/542* (2013.01); *B29C 70/548* (2013.01)

(58) Field of Classification Search
CPC ............ B29C 45/0005; B29C 33/0038; B29C 33/405
USPC .......................................................... 264/313
See application file for complete search history.

(56) References Cited

U.S. PATENT DOCUMENTS

| | | | |
|---|---|---|---|
| 5,151,277 | A | 9/1992 | Bernardon et al. |
| 5,374,388 | A | 12/1994 | Frailey |
| 5,439,635 | A | 8/1995 | Seemann |
| 6,298,896 | B1 | 10/2001 | Sherrill et al. |
| 6,361,731 | B1 * | 3/2002 | Smith et al. ................ 264/271.1 |
| 2004/0000745 | A1 * | 1/2004 | Channer ....................... 264/511 |
| 2007/0278718 | A1 | 12/2007 | Okoli et al. |

FOREIGN PATENT DOCUMENTS

| | | |
|---|---|---|
| CA | 2487738 A1 | 5/2006 |
| DE | 199 26 896 A1 | 12/2000 |
| DE | 102 32 278 A1 | 2/2003 |
| DE | 101 50 659 A1 | 5/2003 |
| DE | 11 2006 002 880 | 9/2008 |
| GB | 2 364 266 A | 1/2002 |
| WO | 01/76863 A2 | 10/2001 |
| WO | 02/02299 A1 | 1/2002 |

\* cited by examiner

*Primary Examiner* — Galen Hauth
(74) *Attorney, Agent, or Firm* — Whitham Curtis Christofferson & Cook, PC

(57) ABSTRACT

A mold to produce fiber composite components is described where a fiber ply with matrix material (matrix material/resin) is saturated. The mold consists of a lower mold and an upper mold which is placed on top of the lower mold with intermediate fiber ply. The lower mold and upper mold have a contour matching each other and for the desired fiber composite component. The upper mold and the lower mold are made of a flexible material.

4 Claims, 2 Drawing Sheets

MOLD FOR MANUFACTURE OF FIBER COMPOSITE PARTS AND METHOD OF MANUFACTURE OF FIBER COMPOSITE PARTS WITH SUCH A MOLD

FIELD OF THE INVENTION

The invention relates to a mold for manufacture of fiber composite parts and, more specifically, molds where a fiber ply is saturated with a matrix material.

The invention further relates to a method for manufacture of fiber composite parts with such a mold.

BACKGROUND

Fiber composite material, particularly carbon-fiber-reinforced plastics and fiberglass reinforced plastics are used in many forms, particularly in the manufacture of aircrafts. Increasingly, such critical components as wings and center wing boxes are made of fiber composite materials.

The semi-finished product costs of the materials used are relatively high and a reduction of costs via the manufacturing process is difficult. This is mainly possible by reduction of material waste and rework. Additionally, high costs result from the manufacture of molds which are used for mass production of structural elements. Such molds are usually made of metallic materials by use of a suitable procedure such as cutting or milling. Thus, such molds are very precise, but also heavy, expensive and require a lot of effort.

Due to the accuracy of the tools the quality of a component can also be further improved by automation, e.g. combination and shortening of individual production steps. At the same time, this also leads to a reduction in production costs. In case of the available manufacturing processes the first step is the cutting of the fiber ply and following that there is the placing of the fiber ply onto the tool. Both steps can be performed manually or be automated, in this case the differences in investment costs for facilities and operation stay in contrast to the result achieved and manufacturability.

Additionally, especially in case of non-planar structures, but also due to the semi-finished material, a preforming is required. Either by application of a so-called binder, heat or vacuum or with a suitable combination thereof the flat semi-finished fiber is brought into the required form. Multiaxial ply which does not need to be remolded is not suitable for all geometries and also extremely expensive.

Following the preforming the mold is sealed or closed and it follows the curing, respectively resin injection in an autoclave. The utilization of a cold-curing resin system and non-use of the autoclave are possible but lead to a reduction in component quality.

The process of preforming is associated with great effort and additional costs. The use of a binder requires not only the material costs, but also application of heat which might be—depending on the components—required for any layer. When working with vacuum technology, in addition to the associated time expenditure there is also an increase in waste volume and there are also additional costs.

On the side of the molds there are high costs for the material itself but also for the production of the molds. The process is long-drawn-out and requires a lot of effort. Thus, in case of, in aviation typical, overall lengths of several meters it requires large-scale processing systems. Tools of this size are also very heavy and therefore difficult to handle.

The manufacture of a component is done in several steps, and the preforming and sealing require a lot of effort.

Additionally, metallic molds are inflexible. In case of a changing curvature of a structural element manufacture of a complete new mold is required. Especially, when during the development phase of a structure such parameters do change, considerable additional costs will result.

The described influencing factors lead—as a whole—to increased production costs for fiber composite parts, especially for small volume production and reduce the achievable production rates. Thus, the cost-effectiveness of the manufacturing process is adversely affected. Generally, changes in structure can not be considered later with the use of an unchangeable tool. Such changes might be, for example, elevations and depressions which are caused due to local changes in thickness of the support surface.

SUMMARY

The invention relates to a mold for manufacture of fiber composite parts where a fiber ply is saturated with a matrix material, including a lower mold and an intermediate fiber ply with an upper mold placed onto the lower mold whereby the lower mold and upper mold are designed with a matching contour for the desired shape of the fiber composite part.

The invention relates to a method for manufacture of fiber composite parts with such a mold by placing a fiber ply onto a lower mold and closing the mold by placing an upper mold onto the lower mold with intermediate fiber ply.

Starting from there, the object of the invention at hand is to provide an improved mold and an improved method for the production of fiber composite parts with which also small amounts of similar fiber composite parts can be manufactured easily and flexibly and adapted in terms of a two or three dimensional direction.

The task is solved by using flexible material for the lower mold and upper mold.

In this way, the curvature and torsion of the fiber composite part is simply adjust by changing the curvature of the flexible upper and lower mold to the desired shape. For this it is required that the upper and lower mold be placed on a suitably set up solid surface. The upper and lower mold take on the desired curvature due to the flexible material.

The basic outline of the fibre composite component is defined by suitable shaping of the upper and lower mold. The orientation of this correction in space can be specified in the second step due to the flexibility of the material of the upper and lower mold.

This makes it possible—during the process of development of structures made of fiber composite materials—to produce inexpensively and fast a given geometry without ignoring precision. Upper and lower molds made of flexible material are relatively easy to manufacture and provide reduced costs in spite of rapid production of structural components with high accuracy.

The upper and lower molds made of flexible material can be used for manufacture of fiber composite parts using wet technology (Resin Transfer Molding, Single Line Injection) or preimpregnated fibers (Prepreg) technology.

It is particularly advantageous when at least one injection nozzle/evacuation adapter for matrix material (matrix material/resin) is integrated into the lower mold and/or upper mold.

Furthermore, it is especially advantageous for manufacture of fiber composite parts with injection and Prepreg technology when a sprue line is connected with the injection nozzle and placed into the support side of the upper mold and/or lower mold for the superposable matting shape with intermediate fiber ply. The gap between lower and upper mold is then evacuated with the injection nozzle so that air and excess matrix material is removed.

Furthermore, it is advantageous if a cavity is made at the support side of the upper mold and/or lower mold for the support side of the matting shape with intermediate fiber ply. Thus, the resinous matrix material, stored in the cavity, can be pulled through the fiber ply and air bubbles and excess matrix material can be stripped off via the injection nozzle. The extraction is done relatively even with assistance of the sprue line via the width of the fiber material which width is defined by the sprue line. Therefore, no extra material in the form of a vacuum foil or sealing tape is required. Similarly, the process of sealing is no longer required since the mold itself closes vacuum-tight. The amount of labor connected with it is reduced.

Optionally, the matrix material can be inserted also via the injection nozzle into the gap and partially also be removed through the extractor connection piece in the cavity.

It is particularly advantageous if one lower mold and/or upper mold on the support side for the opposite side would have at least one annular groove and the opposite mold at least one to the groove adapted annular bead to immerse into the groove and to seal the mold towards the outside. With such an annular seal the upper and lower mold can be coupled very fast and easily in an air-tight manner. Additional sealing of the flexible upper and lower mold is not required. Thus, it results in material and time savings.

The upper mold and lower mold, for example, can have two spaced apart arranged annular grooves and/or beads. Therefore, this creates an inner seal and an outer seal. In the gap between the inner seal and outer seal there should be at least one suction nozzle for a suction unit to produce a sealing vacuum within the gap. Such gap, where a vacuum can be produced, permits a fast, simple and highly reliable seal for the mold.

Further, the invention is achieved by the method of the foregoing way with the following steps:
Shaping of a defined three-dimensional orientation of the fiber composite component by placing of the flexible mold onto a firm to the desired orientation adapted support surface and
Curing of the fiber composite component saturated with a matrix material (matrix material/resin).

The flexible mold allows adapting a contour predetermined by the mold to a desired three-dimensional orientation which is predetermined by a firm support surface which is adapted to the desired orientation. After placing of the fiber ply onto the lower mold, closing of the mold and placing an upper mold onto the lower mold with intermediate fiber ply and predefinition of the three-dimensional orientation by placing of the flexible mold onto the respective adapted support surface the curing of the fiber composite component saturated with matrix material can take place. Then the final product does have the contour predefined by the flexible mold in the three-dimensional orientation defined by the support surface.

It is particularly advantageous if the mold is sealed by evacuating a gap between an inner seal and outer seal, which is created by immersion of annular beads of a mold into the corresponding grooves of the opposite mold.

After placing of the fiber ply between the lower mold and upper mold, placing of the upper mold onto the lower mold with intermediate fiber ply and sealing of the mold it is thereafter easily possible to inject matrix material into the gap containing the fiber ply and to cure the saturated fiber composite component.

It is also possible to use a semi-finished product saturated with matrix material (Prepreg). For such, injection of resin is not required. For better part quality the surrounding of the part is evacuated and cured at elevated pressure.

BRIEF DESCRIPTION OF THE DRAWINGS

In the following, the invention is illustrated by an embodiment with the accompanying drawings. The following is depicted.

DETAILED DESCRIPTION

Figure 1:
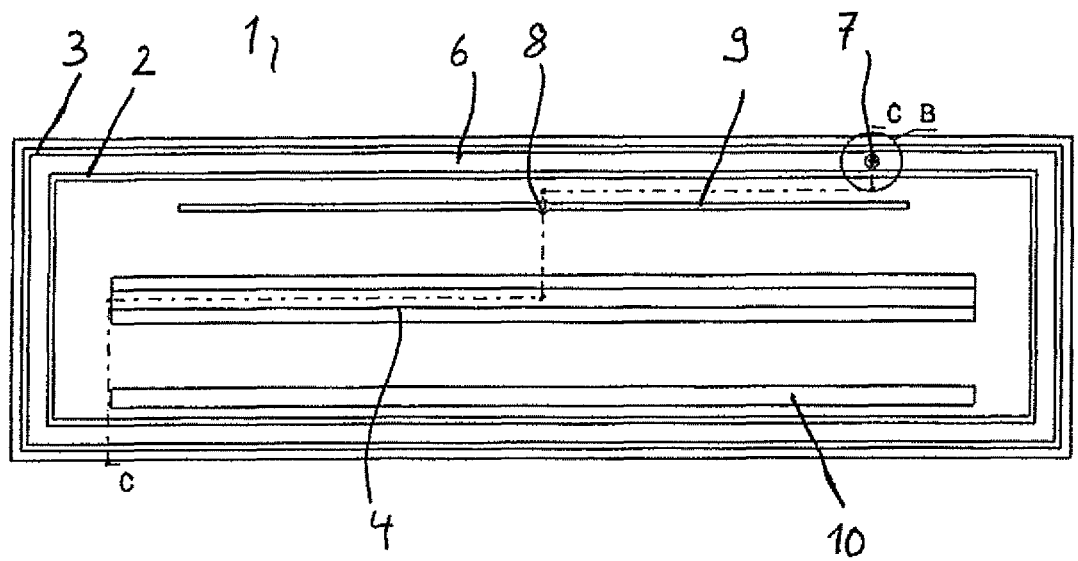
FIG. 1—Sketch of a top view of the support surface of an upper form.

In FIG. 1 one can see a sketch of an upper mold 1 in top view onto the support surface for fiber ply. The upper mold 1 is made of a flexible material, preferably silicone based material. For this purpose, the required geometry of the desired fiber composite component is represented by a prototype. Then this prototype is molded with a silicone and represents the component geometry to be produced. Alternatively, a lower and upper mold can be produced by extrusion using a bottom die.

The upper mold 1 is hermetically sealed at its outer edge regions with an inner seal 2 and an outer seal 3 in its interior space. For this purpose an annular groove, respectively bead is used as inner and outer seal 2, 3.

Figure 2:
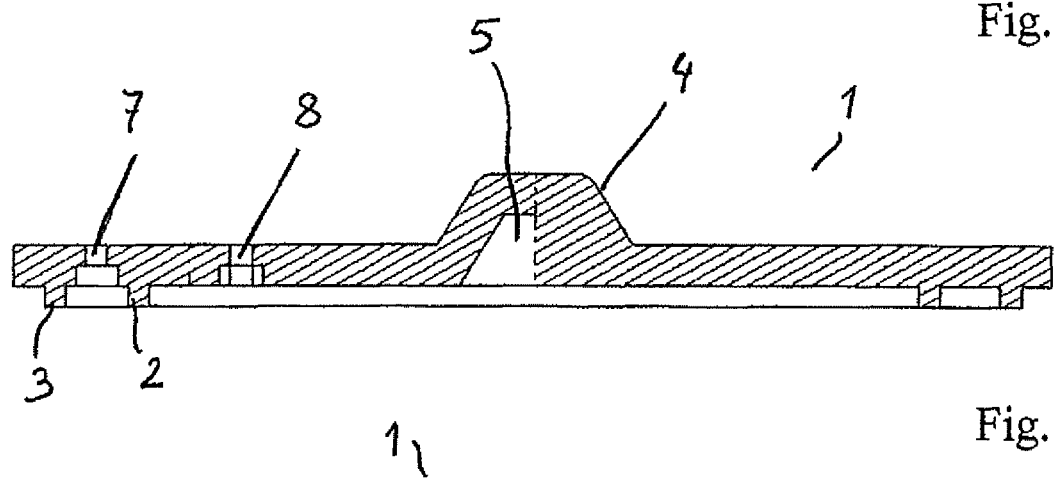
FIG. 2—Cross-sectional view of the upper mold FIG. 1.

One can see in FIG. 2 which shows the upper mold of FIG. 1 in cross-sectional view C-C that both inner seal 2 and outer seal 3 have an annular bead. The beads of the inner and outer seals 2, 3 stand out from the support surface of upper mold 1.

In the illustrated embodiment the contour for the fiber composite component, to form a bulkhead for an aircraft fuselage in the middle of an over most of the length extending projection 4 which is created by producing a valley in the upper mold 5.

Figure 3:
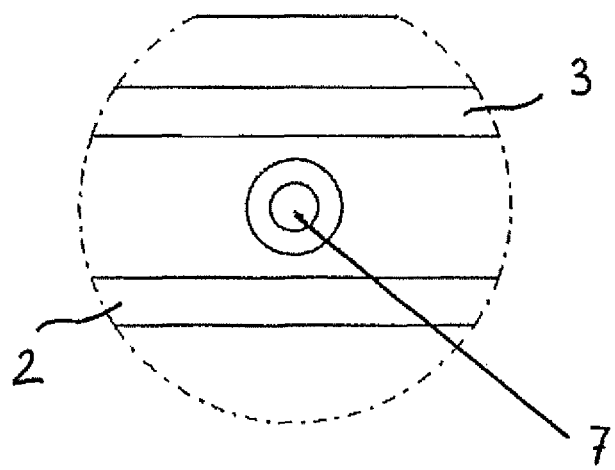
FIG. 3—Sectional view of suction nozzle between an inner and outer sealing.

In order to place the upper mold 1 air-tight onto the lower mold the inner and outer seal 2 and 3 are spaced apart, with a space 6, from each other. This space 6 can be evacuated with a suction nozzle 7 in space 6 by suction of the air located in space 6 and producing a vacuum. This suction nozzle 7 is shown again in top sectional view B in FIG. 3.

From this and the cross section of FIG. 1 it can be clearly seen that the bore of the suction nozzle 7 is graded with different diameters. This does have the advantage that hose connections can be secured well onto the drill holes and the transition from the hose connection to space 6 and valley is improved.

Furthermore, an injection nozzle 8 is integrated in the interior of the upper mold 1 in the upper mold 1. This injection nozzle 8, for example, is also designed with a graded drill hole with different diameters as shown in FIG. 2. A sprue line 9 extends from the injection nozzle 8 on both sides and with the injection nozzle 8 air bubbles and excess resin-containing matrix material can be evenly removed across the width defined by the sprue line 9 from the fiber ply placed onto the upper mold 1.

Opposite of the sprue line there is a cavity 10 extending parallel to the sprue line 9 which fills with excess matrix material and possibly foreign matter and air.

Optionally, an additional nozzle can be provided in the cavity for extracting excess resin and contaminant from the component so that a fiber composite component results with significantly less air bubbles and impurities.

The upper mold as seen in FIG. 2 with a partial section is closed at the end faces all around.

Figure 4:
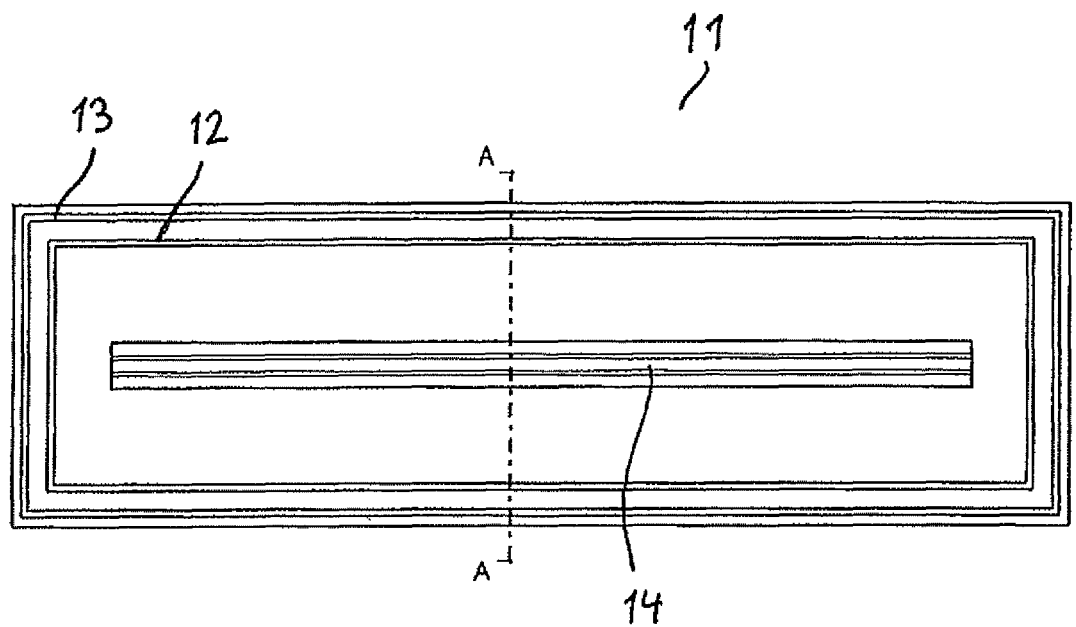
FIG. 4—Sketch of a top view of the support surface of a lower mold adapted to the upper mold from FIG. 1
Figure 5:
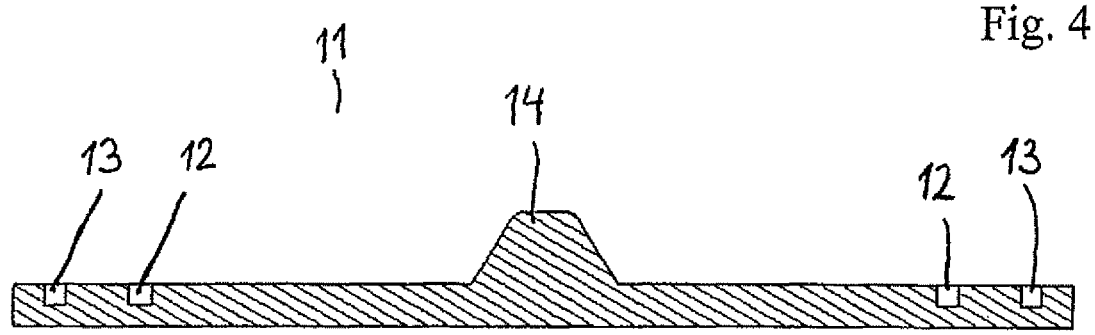
FIG. 5—Cross-sectional view of the lower mold from FIG. 4.

In FIG. 4 one can see a sketch of an lower mold 11 in top view onto the support surface of the upper mold with intermediate fiber ply. The lower mold 11 does have an inner seal 12 as well, and an outer seal 13 which is formed in the illustrated embodiment by annular grooves at the edge regions which immerse into the beads of the inner seal 2 and the outer seal 3 of the lower mold 1. Of course, the embodiment can also be vice versa, whereby the inner and/or outside seal 2, 3 of the upper mold 1 is designed with grooves and the inner seal 12 and/or outer seal 13 with complementary beads. Other geometries for the formation of the inner and outer seal 2, 12, 3, 13 are possible. FIG. 5 shows the cross-sectional view A-A of the lower mold 11 as shown in FIG. 4.

In the lower mold 11 no inlet and outlets are placed. Only one curvature 14 corresponding to valley 5 is intended in the central region which determines the desired contour of the fiber composite part to be produced.

Figure 6:
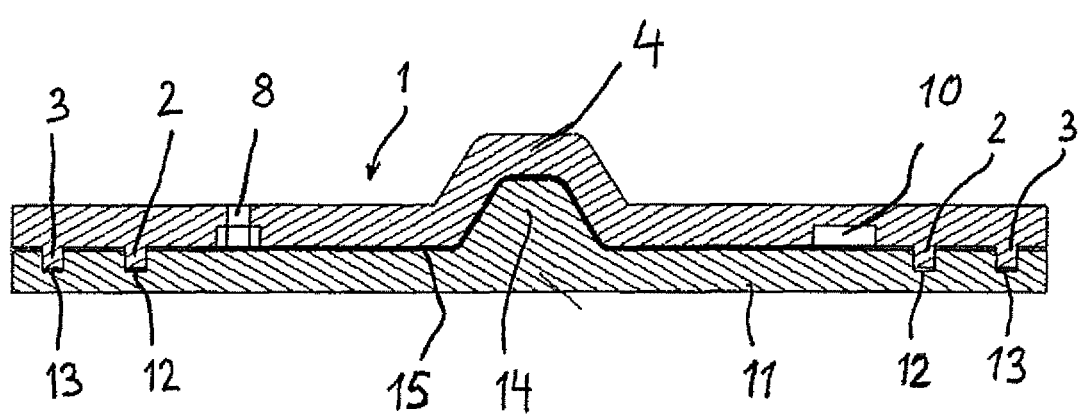
FIG. 6—Mold with a lower and upper mold and intermediate fiber ply.

In FIG. 6 one can be see a lower mold 11 with placed fiber ply 15 and an upper mold 1 which covers the lower mold 11 and the fiber ply 15. It can be seen that the fiber ply 15 is placed in the inner area limited by seal 12 of the lower and upper mold 11, 1 which make up the forming tool. A matrix material (matrix material/resin) can be injected with an injection nozzle 8 in order to saturate evenly the fiber ply with the matrix material.

In this exemplary manufacturing process of fiber composite components Prepreg and/or dry fiber material is cut and placed level according to the laminate structure outside of the mold. The application of preforming methods is not required. Then the produced layer package is placed on one half of the mold, preferably onto the bottom die 11 and pressed into the counter mold by placing of the counter item, preferably the upper mold 1.

By integrating the injection nozzle 8 with the sprue line 9 and the cavity 10 in the mold production of fiber composite components with injection and Prepreg technology is possible. In the process no extra material in form of vacuum film or sealing tape is needed. Similarly, the process of sealing is no longer required since the mold itself closes vacuum-tight. The amount of labor connected with it is reduced.

The preforming is much easier or is not needed in the conventional sense. The shaping or forming is performed as a step during assembly of the mold. Additional materials such as binder are not required.

The flexibility of the silicone mold—mainly along the longitudinal and vertical axis—allows adjustment of the basic form at different curvatures. In the process the cross section of the structural component is conserved. By placing of the mold onto a firm support surface adapted to the desired orientation a fiber composite component is created with the desired contour—which is defined by the contour of the lower and upper mold 11, 1 as well as the curvature in longitudinal and cross direction defined by the support surface. Therefore, one can manufacture easily and inexpensively with a single mold differently curved composite parts of the same contour. Thus, a single mold with unchanging cross-section can be used for the production of different components by placing into forming tools with different curvature radii.

It is also advantageous in the production of a fiber composite component if the mold shown in FIG. 6 is processed along with the lower mold 11 and with placed on top upper mold 1 and intermediate fiber ply 15 in an autoclave after the forming tool was sealed towards the environment by use of the suction nozzle 7. After a sufficient vacuum is established the interior space of the tool is evacuated with the injection nozzle 8 which serves in this case to remove matrix material and, in particular, air bubbles and produces a sufficient vacuum in the interior of the mold. After a sufficient vacuum has been created with the injection nozzle 8 the fiber composite component is processed in the mold in an autoclave. The demolding at the end of the process cycle, this is to say after curing of the component, requires only the removal of the upper mold 1.

The invention claimed is:

1. A mold for manufacture of fiber composite parts where a semi-finished fiber is saturated with a matrix material, including
    a lower mold;
    an upper mold configured for placement onto the lower mold, at least one of the lower mold and the upper mold being configured to received an intermediate fiber ply, the upper mold and the lower mold together having two spaced apart annular grooves and two complimentary beads which provide an inner seal and an outer seal between the lower and upper molds; and
    at least one suction nozzle provided in a gap between the inner seal and the outer seal for a suction unit to produce a vacuum for sealing in the gap,
    wherein the lower mold and upper mold have a matching contour for a desired shape of a fibre composite part, and
    wherein the lower mold and upper mold are made of flexible material.

2. The mold according to claim 1, further comprising at least one injection nozzle integrated in at least one of the lower mold and the upper mold for injecting the matrix material.

3. The mold according to claim 2, further comprising a sprue line connected with the injection nozzle in a base of at least one of the lower mold and the upper mold, wherein the base is a mold surface facing the intermediate fiber ply.

4. The mold according to claim 1, wherein in a base of at least one of the lower mold and the upper mold a cavity is provided for a superposable mating shape placeable on a support side with the intermediate fiber ply, wherein the base is a mold surface facing the intermediate fiber ply.

* * * * *